(12) United States Patent
Ito et al.

(10) Patent No.: US 7,307,828 B2
(45) Date of Patent: Dec. 11, 2007

(54) ELECTRONIC DEVICE, DIELECTRIC CERAMIC COMPOSITION, AND METHOD OF PRODUCTION OF THE SAME

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 93 days.

(21) Appl. No.: 11/389,075

(22) Filed: Mar. 27, 2006

(65) Prior Publication Data

US 2006/0232911 A1 Oct. 19, 2006

(30) Foreign Application Priority Data

Apr. 4, 2005 (JP) ............... 2005-107855

(51) Int. Cl.
*H01G 4/06* (2006.01)
(52) U.S. Cl. ............... 361/321.4; 361/321.5; 501/139
(58) Field of Classification Search .. 361/321.1–321.5; 501/138–139
See application file for complete search history.

(56) References Cited

U.S. PATENT DOCUMENTS 6,403,513 B1 * 6/2002 Sato et al. ............... 501/137
6,764,976 B2 * 7/2004 Kobayashi et al. ......... 501/139
2005/0286207 A1 * 12/2005 Ito et al. .................. 361/321.2
2005/0286208 A1 * 12/2005 Ito et al. .................. 361/321.5

FOREIGN PATENT DOCUMENTS

| JP | B2 3341003 | 8/2002 |
|----|------------|--------|
| JP | B2 3348081 | 9/2002 |

* cited by examiner

*Primary Examiner*—Eric Thomas
(74) *Attorney, Agent, or Firm*—Oliff & Berridge, PLC (57) ABSTRACT

A dielectric ceramic position having at least a main component including barium titanate, a first subcomponent including at least one type of compound selected from MgO, CaO, BaO, a SrO, a second subcomponent including at least one type of compound selected from $Al_2O_3$, $Li_2O$, and $B_2O_3$, a third subcomponent including at least one type of compound selected from $V_2O_5$, $MoO_3$, and $WO_3$, a fourth subcomponent including an oxide of R1 (where R1 is at least one type of element selected from Sc, Er, Tm, Yb, and Lu), and a fifth subcomponent including $CaZrO_3$ or $CaO+ZrO_2$.

6 Claims, 1 Drawing Sheet

FIG.1

ELECTRONIC DEVICE, DIELECTRIC CERAMIC COMPOSITION, AND METHOD OF PRODUCTION OF THE SAME

BACKGROUND OF THE INVENTION

1. Field of the Invention

The present invention relates to a dielectric ceramic composition having reduction resistance and a method of production of the same and a multilayer ceramic capacitor or other electronic device using this dielectric ceramic composition.

2. Description of the Related Art

Electronic devices such as a multilayer ceramic capacitor are widely being utilized as small sized, large capacity, high reliability electronic devices. A large number is used in each piece of electronic apparatus. In recent years, along with the increasingly smaller sizes ad higher performances of such apparatus, greater demands have been made for further reduction in size, increase in capacity, reduction in price, and improvement of reliability of a multilayer ceramic capacitor.

A multilayer ceramic capacitor is usually produced by successively laminating an internal electrode layer paste and dielectric layer paste by the sheet method, printing method, etc. and simultaneously firing the internal electrode layers and dielectric layers in the stack.

As the conductive material of the internal electrode layers, generally Pd or a Pd alloy is used, but Pd is expensive, so relatively inexpensive Ni, Ni alloys, and other base metals have been coming into use. When using a base metal as the conductive material of the internal electrode layers, if firing in the air, the internal electrode layers are oxidized, so the dielectric layers and internal electrode layers have to be simultaneously fired in a reducing atmosphere. However, if firing in a reducing atmosphere, the dielectric layers are reduced and the specific resistance declines. For this reason, nonreducing dielectric materials have been developed.

However, a multilayer ceramic capacitor using a nonreducing dielectric material has the problem of remarkable degradation of the IR (insulation resistance) due to application of an electrical field, a short IR lifetime, and a low reliability.

Further, a capacitor is required to exhibit good capacity-temperature characteristics. In particular, depending on the application, it is required to exhibit flat capacity-temperature characteristics under severe conditions. In recent years, multilayer ceramic capacitors have come into use for engine electronic control units (ECU) mounted in engine compartments of automobiles, crank angle sensors, antilock brake system (ABS) modules, and other various types of electronic apparatuses. These electronic apparatuses are used for stable engine control, drive control, and brake control and are required to exhibit good circuit temperature stability.

The environment in which these electronic apparatuses are used falls in temperature to below −20° C. in the winter in cold locations. Further, after engine startup, in the summer, the temperature is projected as rising to as high as +130° C. or more. Recently, the wire harnesses used for connecting these electronic apparatuses with their controlled equipment have been eliminated and electronic apparatuses have even begun to be mounted outside the automobiles. Therefore, the environment to which these electronic apparatuses are exposed has been getting more severe. Accordingly, the capacitors used in these electronic apparatuses are required to exhibit flat temperature characteristics in a broad temperature range. Specifically, it is not sufficient when the capacitor-temperature characteristics only satisfy the X7R characteristic of EIA standard (−55 to 125° C. and $\Delta C/C$=within ±15%), and a dielectric ceramic composition satisfying the X8R characteristics of EIA standard (−55 to 150° C. and $\Delta C/C$=within ±15%) is required.

In this regard, the assignee has already proposed a dielectric ceramic composition able to be fired in a reducing atmosphere, having a high permittivity, and satisfying the X8R characteristics in the following explained Japanese Patent No. 3348081 and Japanese Patent No. 3341003.

However, in Japanese Patent No. 3348081 and Japanese Patent No. 3341003, there was the problem that if improving the high temperature accelerated lifetime by raising the annealing temperature after firing, the capacity defect rate of the products (ratio of products where capacity ends up falling below specified value) ended up becoming higher. For this reason, keeping down the capacity defect rate and improving the high temperature accelerated lifetime remains a challenge.

SUMMARY OF THE INVENTION

The present invention was made in consideration of this situation and has as its object the provision of a dielectric ceramic composition having a high permittivity, satisfying the targeted temperature characteristics (for example EIA X8R characteristics (−55 to 150° C., $\Delta C/C$=within ±15%)), able to be fired in a reducing atmosphere, superior in high temperature accelerated lifetime, and improved in capacity defect rate (ratio of products where capacity ends up falling below specified value). Further, the present invention has as its object the provision of a multilayer ceramic capacitor or other electronic device using such a dielectric ceramic composition to realize smaller size and larger capacity, in particular smaller thickness and size.

To achieve the above object, according to the present invention, there is provided a dielectric ceramic composition having at least a main component including barium titanate, a first subcomponent including at least one type of compound selected from MgO, CaO, BaO and SrO, a second subcomponent including at least one type of compound selected from $Al_2O_3$, $Li_2O$ and $B_2O_3$, a third subcomponent including at least one type of compound selected from $V_2O_5$, $MoO_3$ and $WO_3$, a fourth subcomponent including an oxide of R1 (where R1 is at least one type of element selected from Sc, Er, Tm, Yb and Lu), and a fifth subcomponent including $CaZrO_3$ or $CaO+ZrO_2$, wherein the ratios of the subcomponents with respect to the main component as 100 mol are:

first subcomponent: 0.1 to 3 mol, second subcomponent: 1 to 10 mol (however, number of moles of second subcomponent is ratio converted to Al, Li or B elements), third subcomponent: 0.01 to 0.5 mol, fourth subcomponent: 0.5 to 7 mol (however, number of moles of fourth subcomponent is ratio converted to R1 alone), fifth subcomponent: 0<fifth subcomponent≦5 mol.

In the present invention, preferably, as a sixth subcomponent, the composition further has an oxide of R2 (where, R2 is at least one element selected from Y, Dy, Ho, Tb, Gd and Eu), and the content of the sixth subcomponent is, with respect to the main component as 100 mol, 9 mol or less (ever, number of moles of sixth subcomponent is ratio converted to R2 alone).

In the present invention, preferably, as a seventh subcomponent, the composition further has MnO or $Cr_2O_3$, and the content of the seventh subcomponent is, with respect to the main component as 100 ml, 0.5 mol or less (however, ratio converted to Mn or Cr element).

A method of production of a dielectric ceramic composition according to the present invention provides a method of production of a dielectric ceramic composition as set forth in any of the above, comprising firing a dielectric material forming the dielectric ceramic composition after firing, then annealing it at 1000 to 1400° C.

Further, in the method of production of the present invention, the oxygen partial pressure at the time of annealing is preferably $10^{-11}$ MPa or more, particularly $10^{-7}$ to $10^{-6}$ MPa. By annealing under the above predetermined conditions, the high temperature accelerated lifetime can be improved.

An electronic device according to the present invention has dielectric layers comprised of the dielectric ceramic composition of the present invention or a dielectric ceramic composition obtained by the method of production of the present invention. The electronic device is not particularly limited. A multilayer ceramic capacitor, piezoelectric device, chip inductor, chip varistor, chip thermistor, chip resistor, or other surface mounted (SMD) chip type electronic devices may be mentioned.

A multilayer ceramic capacitor according to the present invention is comprised of dielectric layers comprised of the dielectric ceramic composition of the present invention or a dielectric ceramic composition obtained by the method of production of the present invention and internal electrode layers alternately stacked.

According to the present invention, by making the composition of the dielectric ceramic composition the above predetermined composition, it is possible to provide a dielectric ceramic composition having a high permittivity, satisfying the targeted temperature characteristics (for example X8R characteristics), able to be fired in a reducing atmosphere, superior in high temperature accelerated lifetime, and improved in capacity defect rate. In particular, in the present invention, by including the second subcomponent (at least one type of compound selected from $Al_2O_3$, $Li_2O$ and $B_2O_3$) in a predetermined amount, the high temperature accelerated lifetime and capacity defect rate can be effectively improved.

BRIEF DESCRIPTION OF THE DRAWINGS

Below, embodiments of the present invention will be explained in detail based on the drawings, in which.

DESCRIPTION OF THE PREFERRED EMBODIMENTS

Multilayer Ceramic Capacitor 1

Figure 1:
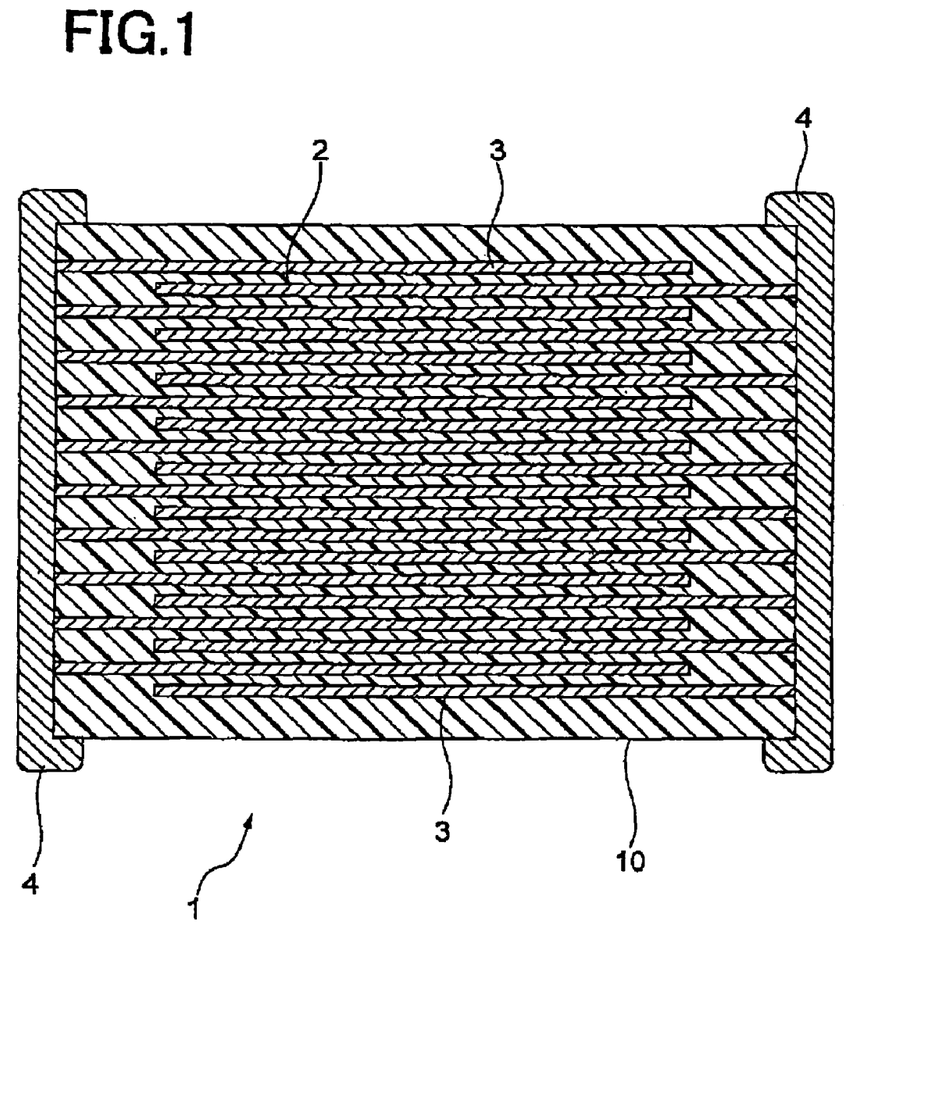
FIG. 1 is a sectional view of a multilayer ceramic capacitor according to an embodiment of the present invention.

As shown in FIG. 1, an electric device according to an embodiment of the present invention, as constituted by a multilayer ceramic capacitor 1, has a capacitor element body 10 comprised of dielectric layers 2 and internal electrode layers 3 alternately stacked. The two ends of the capacitor element body 10 are formed with a pair of external electrodes 4 connected to alternately arranged internal electrode layers 3 inside the element body 10. The internal electrode layers 3 are stacked so that their end faces are alternately exposed at the surfaces of the two facing ends of the capacitor element body 10. The pair of external electrodes 4 are formed at the two ends of the capacitor element body 10 and are connected to the exposed end faces of the alternately arranged internal electrode layers 3 to form a capacitor circuit.

The capacitor element body 10 is not particularly limited in outside shape or dimensions. These can be suitably set in accordance with the application. Normally, the outside shape is substantially a parallelepiped shape. The dimensions may usually be a length of (0.4 to 5.6 mm)×width (0.2 to 5.0 mm)×height (0.2 to 1.9 mm) or so.

Dielectric Layers 2

The dielectric layers 2 contain the dielectric ceramic composition of the present invention.

The dielectric ceramic composition of the present invention is comprised of a main component constituted by barium titanate, a first subcomponent including at least one type of compound selected from MgO, CaO, BaO and SrO, a second subcomponent including at least one type of compound selected from $Al_2O_3$, $Li_2O$ and $B_2O_3$, a third subcomponent including at least one type of compound selected from $V_2O_5$, $MoO_3$ and $WO_3$, a fourth subcomponent including an oxide of R1 (where R1 is at least one type of element selected from Sc, Er, Tm, Yb and Lu), and a fifth subcomponent including $CaZrO_3$ or $CaO+ZrO_2$.

The main component constituted by barium titanate is preferably expressed by the formula $Ba_mTiO_{2+m}$, where m is $0.995 \leq m \leq 1.010$ and a ratio of Ba and Ti is $0.995 \leq Ba/Ti \leq 1.010$.

The ratios of the subcomponents, with respect to the main component constituted by barium titanate, are first subcomponent: 0.1 to 3 mol,
second subcomponent: 1 to 10 mol,
third subcomponent: 0.01 to 0.5 mol,
fourth subcomponent; 0.5 to 7 mol,
fifth subcomponent: 0<fifth subcomponent$\leq$5 mol, preferably,
first subcomponent: 0.5 to 2.5 mol,
second subcomponent: 2 to 5 mol,
third subcomponent: 0.1 to 0.4 mol,
fourth subcomponent: 0.5 to 5.0 mol,
fifth subcomponent: 0.5 to 3 mol.

Note that the ratio of the second subcomponent is not the mol ratio of each oxide, but the ratio converted to Al, Li or B element. That is, for example, when using a second subcomponent comprised of $Al_2O_3$, a ratio of the second subcomponent of 1 mol means not a ratio of $Al_2O_3$ of 1 mol, but a ratio of Al of 1 mol. Further, similarly, a ratio of the fourth subcomponent is not the mol ratio of an oxide of R1, but a mol ratio converted to R1 element.

In this specification, the oxide forming the main component and the subcomponents are expressed to stoichiochemical composition, but the oxidation states of the oxide may also be off from the stoichiochemical compositions. However, the ratios of the subcomponent are found by conversion from the amounts of metal contained in the oxides forming the subcomponents to oxides of the above stoichiochemical compositions.

The reasons for limitation of the contents of the above subcomponents are as follows.

If the content of the first subcomponent (MgO, CaO, BaO and SrO) is too small, the rate of change of the capacity to temperature ends up becoming larger. On the other hand, if the content is too great, the sinterability deteriorates. Note that the ratios of the respective oxides in the first subcomponent may be any.

The second subcomponent ($Al_2O_3$, $Li_2O$ and $B_2O_3$) functions as a sintering aid and has the effect of improving the sinterability of the dielectric ceramic composition and the effect of preventing a drop in the electrostatic capacity at the time of annealing. Therefore, by using the second subcomponent, relatively high temperature annealing becomes possible and the dielectric layers can be sufficiently reoxidized, so the high temperature accelerated lifetime can be improved. If the content of the second subcomponent is too small, dielectric ceramic composition ends up deteriorating in sinterability and sintering becomes difficult. On the other hand, if the content is too great, the capacity defect rate deteriorates and the high temperature accelerated lifetime ends up deteriorating.

The third subcomponent ($V_2O_5$, $MoO_3$ and $WO_3$) has the effect of flattening the capacity-temperature characteristics above the Curie temperature and the effect of improving the IR lifetime. If the content of the third subcomponent is too small, these effects become insufficient. On the other hand, if the content is too great, the IR remarkably drops. Note that the ratios of the respective oxides in the third subcomponent may be any.

The fourth subcomponent (oxide of R1) has the effect of shifting the Curie temperature to the high temperature side and the effect of flattening the capacity-temperature characteristics. If the content of the fourth subcomponent is too small, these effects become insufficient and the capacity-temperature characteristics end up deteriorating. On the other hand, if the content is too great, the sinterability tends to deteriorate. In the fourth subcomponent, an oxide of Yb is preferable due to the high effect in improvement of the characteristics and low cost.

The fifth subcomponent ($CaZrO_3$) has the effect of shifting the Curie temperature to the high temperature side and the effect of flattening the capacity-temperature characteristics. Further, it has the effect of improving the CR product and the DC insulation breakdown strength. However, if the content of the fifth subcomponent is too great, the IR accelerated lifetime remarkably deteriorates and the capacity-temperature characteristics (X8R characteristics) ends up deteriorating. The form of addition of $CaZrO_3$ is not particularly limited. CaO or another oxide comprised of Ca, $CaCO_3$ or another carbonate, an organic compound, $CaZrO_3$, etc. may be mentioned. The ratio of Ca and Zr is not particularly limited and may be determined as an extent not allowing dissolution in the main component constituted by $BaTiO_3$, but the mol ratio of Ca to Zr (Ca/Zr) is preferably 0.5 to 1.5, more preferably 0.8 to 1.5, furthermore preferably 0.9 to 1.1.

By adjusting the contents of the fourth subcomponent (oxide of R1) and fifth subcomponent ($CaZrO_3$), it is possible to flatten the capacity-temperature characteristics (X8R characteristics) and improve the high temperature accelerated lifetime and CR product. In particular, in the above numerical range, deposition of hetero phases is suppressed and the structure can be made uniform. If the content of the fourth subcomponent is too great, a pyrochlore phase as enormous acicula crystal is easily deposited, and, when reducing the thicknesses between the dielectric layers in the multilayer ceramic capacitor, a remarkable deterioration of the characteristics (reduction in CR product) is observed. On the other hand, if the content of the fourth subcomponent is too small, the capacity-temperature characteristics can no longer be satisfied. If the content of the fifth subcomponent is too great, the CR product and the DC breakdown voltage VB are improved, but the capacity-temperature characteristics deteriorate an the IR accelerated lifetime also deteriorates.

The dielectric ceramic composition of the present invention preferably contains, in accordance with need, a sixth subcomponent comprised of an oxide of R2 (where, R2 is at least one type of element selected from Y, Dy, Ho, Tb, Gd and Eu). The content of the sixth subcomponent is, with respect to the main component as 100 mol, preferably 9 ml or less, more preferably 0.5 to 9 mol. Note that the ratio of the sixth subcomponent is not the mol ratio of the oxide of R2, but the mol ratio converted to the R2 element.

This sixth subcomponent (oxide of R2) has the effect of improving the IR and IR lifetime and has little detrimental effect on the capacity-temperature characteristics. However, if the content of the oxide of R2 is too great, the sinterability tends to deteriorate. In the sixth subcomponent, an oxide of Y is preferable due to the high effect in improvement of the characteristics and low cost.

Further, the total content of the fourth subcomponent and sixth subcomponent, with respect to the main component as 100 mol, is preferably 13 mol or less, more preferably 10 mol or less (however, the namers of moles of the fourth subcomponent and sixth subcomponent are ratios of R1 and R2 alone). This is to maintain a good sinterability.

Further, the dielectric ceramic composition of the present invention may contain a seventh subcomponent comprised of MnO or $Cr_2O_3$. This seventh subcomponent has the effect of promoting sintering, the effect of raising the IR, and the effect of raising the IR lifetime. To obtain these effects sufficiently, the ratio of the seventh subcomponent with respect to the component as 100 mol is preferably 0.01 mol or more. However, if the content of the seventh subcomponent is too great, it will have a detrimental affect on the capacity-temperature characteristics, so the content is preferably 0.5 mol or less converted to Mn or Cr element.

Note that the dielectric ceramic composition of the present invention may also contain additional ingredients other than the above first to seventh subcomponents. As such additional ingredients, for example, a silicon oxide ($SiO_2$ etc.), a silicon-containing complex oxide (($Ba, Ca)SiO_2$ etc.), etc. may be mentioned. However, if these silicon-containing compounds are included in large amounts, when raising the temperature of the annealing after firing, there is the problem that the capacity defect rate in the products (ratio of products where capacity ends up falling below specified value) ends up deteriorating. For this reason, when include a silicon oxide or a silicon-containing complex oxide, its content is preferably as small as possible, that is, with respect to the main component as 100 mol, preferably 5 mol or less, more preferably 3 mol or less. In particular, in the present invention, it is preferable to a silicon oxide or a silicon-containing complex oxide not substantially be contained.

Note that when at least one type of Sr, Zr and Sn replaces the Ba or Ti in the main component forming the perovskite structure, the Curie temperature shifts to the low temperature side, so the capacity-temperature characteristics at 125° C. and higher become poor. For this reason, it is preferable to not use $BaTiO_3$ containing these elements [for example (Ba, Sr) $TiO_3$] as the main component. However, there is no particular problem if levels include as impurities (less than 0.1 mol % of the dielectric ceramic composition as a whole).

The average crystal grain size of the dielectric ceramic composition of the present invention is not particularly limited and may be suitably selected in accordance with the thickness of the dielectric layer etc. from for example 0.1 to 3 μm in range. The capacity-temperature characteristics deteriorate the thinner the dielectric layers and tend to deteriorate the smaller the average crystal grain size. For this reason, the dielectric ceramic composition of the present invention is particularly effective when it is necessary to reduce the average crystal grain size, specifically, when the average crystal grain size is 0.1 to 0.5 μm. Further, if reducing the average crystal grain size, the IR lifetime becomes longer and the change in capacity over time under a DC field becomes smaller, so from this viewpoint as well, the average crystal grain size is preferably small as explained above.

The Curie temperature of the dielectric ceramic composition of the present invention (temperature of phase transformation from a ferroelectric material to a paraelectric material) may be changed by selecting the composition, but to satisfy the X8R characteristics, it is preferably 120° C. or more, more preferably 123° C. or more. Note that the Curie temperature can be measured by a DSC (differential scan calorimeter) etc.

The multilayer ceramic capacitor using the dielectric ceramic composition of the present invention may be preferably used as an electronic device for apparatus used in environments of 80° C. or more, in particular 125 to 150° C. Further, in this temperature range, the capacity-temperature characteristics also satisfy the EIA X8R characteristics. Further, it can simultaneously satisfy the EIAJ B characteristics [−25 to 85° C., rate of change of capacity within ±10% (reference temperature 20° C.)] and the EIA X7R characteristics (−55 to 125° C., ΔC=within ±15%).

In a multilayer ceramic capacitor, the dielectric layers are usually subjected to an AC field of 0.02 V/μm or more, in particular 0.2 V/μm or more, further 0.5 V/μm or more, generally 5 V/μm or less, and, overlapping this, a DC field of 5 V/μm or less, but even if such fields are applied, the capacity-temperature characteristics are extremely stable in the present embodiment.

The number of layers, thickness, and other conditions of the dielectric layers 2 may be suitably determined in accordance with the objective and application, but in the present embodiment, the thickness of the dielectric layers 2 is preferably a thin 7.5 μm or less, more preferably 4 μm or less. In the present embodiment, even if making the dielectric layers 2 thin in this way, the various electrical characteristics of the capacitor 1, in particular, the high permittivity, can be maintained, the predetermined capacity-temperature characteristics can be satisfied, and the capacity defect rate and high temperature accelerated lifetime can be improved.

Internal Electrode Layers 3

The conductive material contained in the internal electrode layers 3 is not particularly limited, but since the materials forming the dielectric layers 2 have reduction resistance, a base metal may be used. As the base metal used as the conductive material, Ni or an Ni alloy is preferable. As an Ni alloy, an alloy of Ni with one or more elements selected from Mn, Cr, Co and Al is preferable. The content of Ni in the alloy is preferably 95 wt % or more.

Note that Ni or Ni alloy may also contain P or other various types of minor ingredients in an amount of 0.1 wt % or so or less.

The thickness of the internal electrode layers may be suitably determined in accordance with the application etc., but usually is 0.5 to 5 μm, in particular 0.5 to 2.5 μm or so.

External Electrodes 4

The conductive material contained in the external electrodes 4 is not particularly limited, but in the present embodiment, the inexpensive Ni, Cu, or their alloys can be used. The thickness of the external electrodes 4 may be suitably determined in accordance with the application etc., but usually is 10 to 50 μm or so.

Method of Production of Multilayer Ceramic Capacitor 1

A multilayer ceramic capacitor using the dielectric ceramic composition of the present invention, like a conventional multilayer ceramic capacitor, is produced by fabricating a green chip by a usual printing method or sheet method using pastes, firing this, then printing or transferring and then firing the external electrodes. Below, the method of production will be explained in further detail.

The dielectric layer paste may be an organic slurry comprised of a dielectric material and organic vehicle kneaded together or a water-based coating.

The dielectric material used may be an above oxide or their mixtures or complex oxides, but it is also possible to suitably select and mix various compounds forming the above oxides or complex oxides by firing, for example, carbonates, oxalates, nitrates, hydroxides, organometallic compounds, etc. The contents of the respective compounds in the dielectric material should be determined so as to give the composition of the above dielectric ceramic composition after firing. The dielectric material used usually is a powder having an average particle size of 0.1 to 3 μm or so.

The organic vehicle is obtained by dissolving a binder in an organic solvent. The binder used for the organic vehicle is not particularly limited and may be suitably selected from ethyl cellulose, polyvinyl butyral, and other usual various types of binders. Further, the organic solvent used is also not particularly limited and may be suitably selected in accordance with the method of use such as printing method, sheet method, from terpineol, butyl carbitol, acetone, toluene, and other various types of organic solvents.

Further, when making the dielectric layer paste a water-based slurry, a water-based vehicle comprised of a water-soluble binder or dispersant etc. dissolved in water may be kneaded with the dielectric material. The water-soluble binder used for the water-based vehicle is not particularly limited, but, for example, polyvinyl alcohol, cellulose, a water-soluble acryl resin, etc. may be used.

The internal electrode layer paste is prepared by kneading the above various types of conductive materials comprised of conductive metals or their alloys or various types of oxides, organometallic compounds, resonates, etc. forming the above conductive materials after firing and the above organic vehicle.

The external electrode paste may be prepared in the same way as the internal electrode layer paste.

The contents of the organic vehicles in the above pastes are not particularly limited. The usual contents, for example, for the binder, 1 to 5 wt % or so and for the solvent, 10 to 50 wt % or so, may be used. Further, the pastes may, in accordance with need, contain various types of additives selected from dispersants, plasticizers, dielectric insulators, etc. The total content of these is preferably 10 wt % or less.

When using the printing method, the dielectric layer paste and internal electrode layer paste are printed in successive layers on a PET or other substrate, then the stack is cut to predetermined sizes which are then peeled off from the substrate to obtain green chips.

Further, when using the sheet method, the dielectric layer paste is used to form a green sheet, this is printed with the internal electrode layer paste, then this is stacked to form a green chip.

Before firing, the green chip is treated to remove the binder. The treatment for removing the binder may be performed under the usual conditions, but when using as the conductive material of the internal electrode layers Ni or an Ni alloy or other base metal, the chip is heated in an air atmosphere by a rate of temperature rise of preferably 5 to 300° C./hour, more preferably 10 to 100° C./hour, and held at a holding temperature of preferably 180 to 400° C., more preferably 200 to 300° C., for a temperature holding time of preferably 0.5 to 24 hours, more preferably 5 to 20 hours.

The atmosphere when firing the green chip may be suitably selected in accordance with the type of the conductive material in the internal electrode layer paste, but when using a conductive material comprised of Ni or an Ni alloy or other base metal, the oxygen partial pressure in the firing atmosphere is preferably $10^{-8}$ to $10^{-12}$ atm. If the oxygen partial pressure is less than that range, the conductive material of the internal electrode layers abnormally sinter and end up causing disconnection in some cases. Further, if the oxygen partial pressure is over said range, the internal electrode layers tend to oxidize.

Further, the holding temperature at the time of firing is preferably 1100 to 1400° C., more preferably 1200 to 1360° C., furthermore preferably 1200 to 1320° C. If the holding temperature is less than said range, the densification becomes insufficient, while if over said range, the internal electrode layers abnormally sinter causing electrode disconnection, the internal electrode layer materials diffuse resulting in deterioration of the capacity-temperature characteristics, or the dielectric ceramic composition is easily reduced.

As other firing conditions, the rate of temperature rise is preferably 50 to 500° C./hour, more preferably 200 to 300° C./hour, the temperature holding time is preferably 0.5 to 8 hours, more preferably 1 to 3 hours, and the cooling rate is preferably 50 to 500° C./hour, more preferably 200 to 300° C./hour. Further, the firing atmosphere is preferably made a reducing atmosphere. As the atmosphere gas, for example, a mixed gas of $N_2$ and $H_2$ which is wetted is preferably used.

In the present embodiment, after firing in a reducing atmosphere, the capacitor element body is annealed. The annealing is treatment for reoxidizing the dielectric layer. This enables the high temperature accelerated lifetime (IR lifetime) to be remarkably lengthened, so the reliability is improved.

The oxygen partial pressure in the annealing atmosphere is preferably $10^{-11}$ MPa or more, in particular $10^{-7}$ to $10^{-6}$ MPa. If the oxygen partial pressure is less than this range, reoxidation of the dielectric layers is difficult, while if over that range, the internal electrode layers tend to oxidize.

The holding temperature at the time of annealing is preferably 1000 to 1400° C., more preferably higher than 1000° C. and 1400° C. or lower. In the present embodiment, as explained above, a relatively high temperature is used for the annealing, so the dielectric layers can be sufficiently reoxidized and the high temperature accelerated lifetime can be effectively improved. For this reason, the reliability of the capacitor can be improved. In particular, in the present embodiment, a sintering aid comprised of at least one compound selected from $Al_2O_3$, $Li_2O$ and $B_2O_3$ constituting the second subcomponent is used, so even when making the annealing temperature a relatively high temperature as explained above, it is possible to effectively prevent deterioration of the capacity defect rate.

If the holding temperature is less than the above range, oxidization of the dielectric layers becomes insufficient, so the IR becomes low and further the high temperature accelerated lifetime becomes short easily. On the other hand, if the holding temperature exceeds the above range, the internal electrode layers are oxidized to reduce the capacity. Not only that, the internal electrode layers end up reacting with the dielectric materials resulting in easier deterioration of the capacity-temperature characteristics, drop in the IR, and drop in the high temperature accelerated lifetime. Note that the annealing may also be comprised of just a temperature raising process and a temperature lowering process. That is, the temperature holding time may also be made zero. In this case, the holding temperature is synonymous with the maximum temperature.

As other annealing conditions, the temperature holding time is preferably 0 to 20 hours, more preferably 6 to 10 hours, and the cooling rate is preferably 50 to 500° C./hour, more preferably 100 to 300° C./hour. Further, as the atmosphere gas in the annealing, for example wetted $N_2$ gas etc. is preferably used.

To wet the $N_2$ gas or mixed gas in the above treatment to remove the binder, firing, and annealing, for example a wetter etc. may be used. In this case, the water temperature is preferably 5 to 75° C. or so.

The treatment to remove the binder, firing, and annealing may be performed consecutively or independently. When performing these consecutively, after the treatment to remove the binder, preferably the atmosphere is changed without cooling, then the temperature is raised to the holding temperature at the time of firing to fire the chip, then temperature is cooled and the atmosphere changed when reaching the holding temperature of annealing to anneal the chip. On the other hand, when performing these independently, preferably, at the time of firing, the temperature is raised to the holding temperature at the time of treatment to remove the binder in an $N_2$ gas or wetted $N_2$ gas atmosphere, then the atmosphere is changed and the temperature continue to be raised. Preferably, the temperature is cooled to the holding temperature at the time of annealing, then the atmosphere is again changed to an gas or a wetted $N_2$ gas atmosphere and the temperature continues to be cooled. Further, at the tire of annealing, it is also possible to raise the temperature to the holding temperature in an $N_2$ gas atmosphere, then change the atmosphere or to perform the entire annealing process in a wetted $N_2$ gas atmosphere.

The thus obtained capacitor element body may be for example end polished by barrel polishing, sandblasting, etc. and printed or transferred and fired with the external electrode paste to form the end electrodes 4. The firing conditions of the external electrode paste are preferably, for example, a mixed gas of wet $N_2$ and $H_2$, 600 to 800° C., and 10 minutes to 1 hour or so. Further, in accordance with need, the external electrodes 4 are plated etc. to form covering layers.

The thus produced multilayer ceramic capacitor of the present invention is mounted on a printed circuit board by soldering etc. and used for various types of electronic apparatus.

Above, an embodiment of the present invention was explained, but the present invention is not limited to the above-mentioned embodiment in any way and may be modified in various ways within a scope not exceeding the gist of the present invention.

For example, in the above-mentioned embodiment, as the electronic device according to the present invention, a multilayer ceramic capacitor was illustrated, but the electronic device according to the present invention is not limited to a multilayer ceramic capacitor and may be any device having dielectric layers comprised of the above dielectric ceramic composition.

EXAMPLES

Below, the present invention will be explained by more detailed examples, but the present invention is not limited to these examples in any way.

Example 1

First, to prepare the dielectric material (dielectric ceramic composition powder), the main component material (BaTiO$_3$) and the following first to seventh subcomponent materials were prepared:

MgCO$_3$ (first subcomponent): 0.36 mol,
Al$_2$O$_3$ (second subcomponent): 0.9 to 10.5 mol,
V$_2$O$_5$ (third subcomponent): 0.1 mol,
Yb$_2$O$_3$ (fourth subcomponent): 2.19 mol,
CaZrO$_3$ (fifth subcomponent): 1.2 mol,
Y$_2$O$_3$ (sixth subcomponent): 2.4 mol,
MnCO$_3$ (seventh subcomponent): 0.15 mol, The amounts of addition of the first, third, fifth, and seventh subcomponents are amounts of addition expressed by number of moles with respect to the main component as 100 mol converted to the oxides or complex oxides, while the amounts of addition of the second, fourth, and sixth subcomponents are amounts of addition converted to Al element, Yb element, and Y element. Further, the amount of the second subcomponent was made the amount of addition shown in Table 1.

Next, these main component and subcomponent material were wet mixed by a ball mill for 16 hours, then dried to obtain the dielectric material. Further, into the obtained dried dielectric material as 100 parts by weight, acryl resin in an amount of 4.8 parts by weight, ethyl acetate in 100 parts by weight, a mineral spirit in 6 parts by weight, and toluene in 4 parts by weight were mixed by a ball mill to a paste so as to obtain the dielectric layer paste.

Next, Ni particles in an amount of 44.6 parts by weight, terpineol in 52 parts by weight, ethyl cellulose in 3 parts by weight, and benzotriazole in 0.4 part by weight were kneaded by a triple roll to a slurry so as to obtain the internal electrode layer paste.

These pastes were used in the following way to produce the multilayer ceramic chip capacitor 1 shown in FIG. 1.

First, the obtained dielectric layer paste was used to form a green sheet an a PET film. This was printed with the internal electrode paste, then the sheet was peeled off from the PET film. Next, such green sheets and protective green sheets (sheets not printed with internal electrode layer paste) were stacked and press bonded to obtain a green chip.

Next, green chip was cut to a predetermined size and treated to remove the binder, fired, and annealed under the following conditions to obtain a multilayer ceramic fired body.

The conditions for the treatment to remove the binder were: rate of temperature rise: 30° C./hour, holding temperature: 260° C., temperature holding time: 8 hours, atmosphere: air.

The firing conditions were: rate of temperature rise: 200° C./hour, holding temperature: 1250 to 1350° C., temperature holding time: 2 hours, cooling rate: 300° C./hour, atmosphere gas: wetted N$_2$+H$_2$ mixed gas (oxygen partial pressure: 10$^{-2}$ Pa).

The annealing conditions were; rate of temperature rise: 200° C./hour, holding temperature: 1200° C., temperature holding time: 2 hours, cooling rate: 300° C./hour, atmosphere gas: wetted N$_2$ gas (oxygen partial pressure: 10$^{-7}$ MPa).

Note that the wetting of the atmosphere gas at the time of firing and annealing was performed using a wetter with a water temperature of 5 to 75° C.

Next, the obtained multilayer ceramic fired body was polished at its end faces by sandblasting, then was coated with external electrodes comprised of In—Ga to obtain each of the samples 1 to 7 of the multilayer ceramic capacitor shown in FIG. 1. In this example, the samples 1 to 7 were prepared by changing the amount of addition of the second subcomponent comprised of Al$_2$O$_3$ as show in Table 1.

The size of each obtained capacitor sample was 3.2 mm×1.6 mm×0.6 mm, the number of dielectric layers sandwiched between internal electrode layers was 4, the thickness of each dielectric layer (interlayer thickness) was 2.7 μm and the thickness of each internal electrode layer was 1.2 μm.

Next, each obtained capacitor sample was measured for capacity-temperature characteristics, capacity defect rate, high temperature accelerated lifetime, and permittivity by the methods shown below.

Capacity-Temperature Characteristics

The capacity-temperature characteristics were evaluated for each obtained capacitor sample by measuring the electrostatic capacity at −55° C. to 150° C. in temperature range. Specifically, the electrostatic capacity was measured using a digital LCR meter (YHP 4274A) under conditions of a frequency of 1 kHz and an input signal level of 1 Vrms. Further, the rate of change of the electrostatic capacity (ΔC/C, unit: %) under an environment of a temperature of 150° C. where the capacity-temperature characteristics became the worst in this temperature range was calculated. In the present example, samples where, at −55 to 150° C., ΔC/C=within ±15%, that is, satisfying the X8R characteristic, were judged as good. The results are shown in Table 1.

Capacity Defect Rate

The capacity defect rate was found by first measuring 100 capacitor samples for electrostatic capacity at a reference temperature of 25° C. by a digital LCR meter under conditions of a frequency of 1 kHz and an input signal level of 1.0 Vrms. Further, the measurement results of the 100 samples were averaged to find the average capacity. Next, the ratio of samples with an electrostatic capacity of less than 80% when this average capacity was designated as 100% was found. This was made the capacity defect rate. In the present example, samples with a capacity defect rate of 20% or less (that is, where, out of 100 samples, there were 20 or less samples with an electrostatic capacity of less than 80%) were judged as good. The results are shown in Table 1.

High Temperature Accelerated Lifetime

Each sample of the capacitor was held at 200° C. in a state with 10 V/μm DC voltage applied so as to measure the high temperature accelerated lifetime. This high temperature accelerated lifetime was evaluated by measuring the average lifetime for 10 capacitor samples. In the present example, the time until the insulation resistance is reduced by one digit from the start of application of voltage was defined as the lifetime. The longer the lifetime, the better. The results are shown in Table 1.

Permittivity $\epsilon$

The permittivity $\epsilon$ was calculated from the electrostatic capacity measured for each capacitor sample at a reference temperature of 25° C. by a digital LCR meter under conditions of a frequency of 1 kHz and an input signal level of 1.0 Vrms (no unit). In the present example, each sample had a permittivity of at least 1000, that is, the results were good.

TABLE 1

| Sample no. | Sintering aid Type | Content [mol] | Temperature characteristics [%] | Capacity defect rate [%] | High temperature accelerated lifetime [h] |
|---|---|---|---|---|---|
| 1 | Comp. ex. | $Al_2O_3$ | 0.9 | Not measurable | | |
| 2 | Ex. | $Al_2O_3$ | 1 | −9.1 | 3 | 10.2 |
| 3 | Ex. | $Al_2O_3$ | 2 | −9.3 | 2 | 20.1 |
| 4 | Ex. | $Al_2O_3$ | 3 | −9.6 | 0 | 56.7 |
| 5 | Ex. | $Al_2O_3$ | 5 | −9.8 | 0 | 45.1 |
| 6 | Ex. | $Al_2O_3$ | 10 | −8.9 | 5 | 16.6 |
| 7 | Comp. ex. | $Al_2O_3$ | 10.5 | −9.8 | 35 | 9 |

In the table, the content of $Al_2O_3$ is expressed as the number of moles converted to Al element.

Table 1 shows the amount of addition of $Al_2O_3$, the capacity-temperature characteristic, capacity defect rate, and the high temperature accelerated lifetime of each of the samples 1 to 7.

From Table 1, the samples 2 to 6 with amounts of addition of the sintering aid comprised of $Al_2O_3$ of 1 to 10 mol all had capacity-temperature characteristics satisfying the X8R characteristics and further had capacity defect rates of 5% or less—all good rests. Further, these samples 2 to 6 were annealed at the relatively high temperatures of 1200° C., so even under relatively severe conditions of 200° C. and 10 V/μm, the high temperature accelerated lives were all at least 10 hours (lifetimes of about double the case where the annealing temperature is 1000° C.)—also good results. In particular, samples 4 and 5 having amounts of addition of $Al_2O_3$ of 3 mol and 5 mol had capacity defect rates of 0% and further had long high temperature accelerated lives so were particularly good in results.

On the other hand, sample 1 having an amount of addition of the sintering aid comprised of $Al_2O_3$ of 0.9 mol had degraded sinterability and was not able to be sintered well. For this reason, a sample able to be evaluated could not be obtained. Further, the sample with an amount of addition of $Al_2O_3$ over 10.5 mol ended up deteriorating in the capacity defect rate to 32% and lacked production stability.

From these results, it was confirmed that by making the amount of addition of $Al_2O_3$, converted to Al element, 1 to 10 mol, preferably 2 to 5 mol, it is possible to maintain a high permittivity while containing a capacity-temperature characteristics satisfying the X8R characteristics and further to keep down the capacity defect rate while improving the high temperature accelerated lifetime.

Example 2

Except for using $Li_2O$ as the second subcomponent, instead of $Al_2O_3$, the same procedure was followed as in Example 1 to obtain capacitor samples 11 to 17. The obtained capacitor samples were evaluated in the same way as in Example 1 for various types of characteristics. The results are shown in Table 2. Note that samples 12 to 16 of this example all had permittivity of 1000 or more and were good in results.

TABLE 2

| Sample no. | Sintering aid Type | Content [mol] | Temperature characteristics [%] | Capacity defect rate [%] | High temperature accelerated lifetime [h] |
|---|---|---|---|---|---|
| 11 | Comp. ex. | $Li_2O$ | 0.9 | Not measurable | | |
| 12 | Ex. | $Li_2O$ | 1 | −7.8 | 6 | 5.8 |
| 13 | Ex. | $Li_2O$ | 2 | −8.2 | 1 | 9.8 |
| 14 | Ex. | $Li_2O$ | 3 | −8.5 | 0 | 29.8 |
| 15 | Ex. | $Li_2O$ | 5 | −8.9 | 0 | 24.4 |
| 16 | Ex. | $Li_2O$ | 10 | −9.1 | 7 | 10.1 |
| 17 | Comp. ex. | $Li_2O$ | 10.5 | −9.8 | 35 | 4.3 |

In the table, the content of $Li_2O$ is expressed as the number of moles converted to Li element.

As shown in Table 2, it can be confirmed that in Example 2 as well using $Li_2O$ as a sintering aid, instead of $Al_2O_3$, trends similar to those of Example 1 are obtained. That is, samples 12 to 16 of example all had capacity-temperature characteristics satisfying the X8R characteristics and were superior in capacity defect rate and high temperature accelerated lifetime. On the other hand, samples 11 and 17 with amounts of addition of $Li_2O$ outside the range of the present invention had problems, that is, sample 11 remained unsintered and sample 17 was inferior in capacity defect rate.

Example 3

Except for using $B_2O_3$ as the second subcomponent, instead of $Al_2O_3$, the same procedure was followed as in Example 1 to obtain capacitor samples 21 to 27. The obtained capacitor samples were evaluated in the same way as in Example 1 for various types of characteristics. The results are shown in Table 3. Note that samples 22 to 26 of this example all had permittivity of 1000 or more and were good in results.

TABLE 3

| Sample no. | Sintering aid Type | Content [mol] | Temperature characteristics [%] | Capacity defect rate [%] | High temperature accelerated lifetime [h] |
|---|---|---|---|---|---|
| 21 | Comp. ex. | $B_2O_3$ | 0.9 | Not measurable | | |
| 22 | Ex. | $B_2O_3$ | 1 | −8.8 | 8 | 6.7 |
| 23 | Ex. | $B_2O_3$ | 2 | −9.1 | 3 | 15.4 |
| 24 | Ex. | $B_2O_3$ | 3 | −9.5 | 2 | 44.5 |
| 25 | Ex. | $B_2O_3$ | 5 | −9.8 | 1 | 38.7 |
| 26 | Ex. | $B_2O_3$ | 10 | −10 | 9 | 12.3 |
| 27 | Comp. ex. | $B_2O_3$ | 10.5 | −10.6 | 42 | 5 |

In the table, the content of $B_2O_3$ is expressed as the number of moles converted to B element.

As shown in Table 3, it can be confirmed that even in Example 3 using $B_2O_3$ as a sintering aid, instead of $Al_2O_3$, trends similar to those of Example 1 are obtained. That is, samples 22 to 26 of example all had capacity-temperature characteristics satisfying the X8R characteristics and were superior in capacity defect rate and high temperature accelerated lifetime. On the other hand, samples 21 and 27 with amounts of addition of $B_2O_3$ outside the range of the present invention had problems, that is, sample 21 remained unsintered and sample 27 was inferior in capacity defect rate.

Example 4

Except for using $(Ba_{0.6}Ca_{0.4})SiO_3$, instead of $Al_2O_3$, the same procedure was followed as in Example 1 to obtain capacitor samples 31 to 37. The obtained capacitor samples were evaluated in the same way as in Example 1 for various types of characteristics. The results are shown in Table 4.

TABLE 4

| Sample no. | Sintering aid Type | Content [mol] | Temperature characteristics [%] | Capacity defect rate [%] | High temperature accelerated lifetime [h] |
|---|---|---|---|---|---|
| 31 | Comp. ex. BCG | 0.9 | Not measurable | | |
| 32 | Comp. ex. BCG | 1 | −8.8 | 32 | 5.7 |
| 33 | Comp. ex. BCG | 2 | −8.9 | 23 | 10.1 |
| 34 | Comp. ex. BCG | 3 | −8.7 | 28 | 30.1 |
| 35 | Comp. ex. BCG | 5 | −8.9 | 31 | 25.4 |
| 36 | Comp. ex. BCG | 10 | −9 | 40 | 10.1 |
| 37 | Comp. ex. BCG | 10.1 | −8.7 | 70 | 4.5 |

In the table, the content of BCG is expressed as the number of moles converted to BCG.

Table 4 shows the amount of addition of $(Ba_{0.6}Ca_{0.4})SiO_3$, capacity-temperature characteristics, capacity defect rate, and high temperature accelerated lifetime for each of the samples 31 to 37. Note that in Table 4, "BCG" means $(Ba_{0.6}Ca_{0.4})SiO_3$. Further, the amount of addition of $(Ba_{0.6}Ca_{0.4})SiO_3$ is shown by the number of moles, converted to complex oxide, with respect to $BaTiO_3$ as 100 mol.

As shown in Table 4, each of ales 31 to 37 using the silicon-containing complex oxide comprised of $(Ba_{0.6}Ca_{0.4})SiO_3$ as a sintering aid, instead of $Al_2O_3$, ended up degraded in capacity defect rate. Note that the reason for the degradation of the capacity defect rate is not necessarily clear, but it is believed that the annealing temperature being a relatively high 1200° C. has an effect.

Example 5

Except for using $SiO_2$, BaO and CaO, instead of $(Ba_{0.6}Ca_{0.4})SiO_3$, the same procedure was followed as in Example 4 to obtain the capacitor samples 41 to 47. The obtained capacitor samples were evaluated in the same way as in Example 1 for various types of characteristics. The results are shown in Table 5. Note that in Example 5, the amounts of addition of $SiO_2$, BaO, and CaO were adjusted to become the same amounts as the samples of Example 4.

TABLE 5

| Sample no. | Sintering aid Type | Content [mol] | Temperature characteristics [%] | Capacity defect rate [%] | High temperature accelerated lifetime [h] |
|---|---|---|---|---|---|
| 41 | Comp. ex. $SiO_2$ | 0.9 | Not measurable | | |
| 42 | Comp. ex. $SiO_2$ | 1 | −9.2 | 40 | 3.1 |
| 43 | Comp. ex. $SiO_2$ | 2 | −9.4 | 32 | 7.8 |
| 44 | Comp. ex. $SiO_2$ | 3 | −9.5 | 35 | 24.3 |
| 45 | Comp. ex. $SiO_2$ | 5 | −9.6 | 41 | 19.1 |
| 46 | Comp. ex. $SiO_2$ | 10 | −9 | 50 | 8.5 |
| 47 | Comp. ex. $SiO_2$ | 10.1 | −8.8 | 80 | 2.1 |

In the table, the content of $SiO_2$ is expressed as the number of moles converted to $SiO_2$ Table 5 shows the amount of addition of $SiO_2$, the capacity-temperature characteristics, capacity defect rate, and high temperature accelerated lifetime of each of the samples 41 to 47. Note that the amount of addition of $SiO_2$ is show by the number of moles, converted to $SiO_2$, with respect to $BaTiO_3$ as 100 mol.

As shown in Table 5, even when using $SiO_2$ as a sintering aid, instead of the silicon-containing complex oxide $(Ba_{0.6}Ca_{0.4})SiO_3$, the capacity defect rate ended up deteriorating in each case. Note that the reason for the deterioration of the capacity defect rate is believed to be the same as in Example 4.

Example 6

Except for further adding to the samples 4, 14, and 24 of Example 1 to 3 $(Ba_{0.6}Ca_{0.4})SiO_3$ in amounts of 1 mol with respect to $BaTiO_3$ as 100 mol, the same procedure was followed as with the samples 4, 14, and 24 of Example 1 to 3 to obtain the samples 51, 52, and 53 in Table 6. The obtained capacitor samples were evaluated in the same way as in Example 1 for the various types of characteristics. The results are shown in Table 6.

TABLE 6

| Sample no. | Sintering aid Type | Content [mol] | Type | Content [mol] | Temperature characteristics [%] | Capacity defect rate [%] | High temperature accelerated lifetime [h] |
|---|---|---|---|---|---|---|---|
| 51 | Ref. ex. $Al_2O_3$ | 3 | BCG | 1 | −11.1 | 20 | 30 |
| 52 | Ref. ex. $Li_2O$ | 3 | BCG | 1 | −10.3 | 25 | 12 |
| 53 | Ref. ex. $B_2O_3$ | 3 | BCG | 1 | −10.7 | 30 | 25 |

In the table, the contents of $Al_2O_3$, $Li_2O$, and $B_2O_3$ are expressed as the numbers of moles converted to Al, Li, and B elements.
The content of BCG is expressed as the number of moles converted to BCG.

As shown in Table 6, sales 51, 52, and 53 using sintering aids comprised of $Al_2O_3$, $Li_2O$, and $B_2O_3$ plus the silicon-containing complex oxide $(Ba_{0.6}Ca_{0.4})SiO_3$ all ended up deteriorated in capacity defect rate. Note that the reason for the deterioration of the capacity defect rate is believed to be the same as in Example 4.

The invention claimed is:

1. A dielectric ceramic composition having at least
a main component including barium titanate,
a first subcomponent including at least one type of compound selected from MgO, CaO, BaO and SrO,
a second subcomponent including at least one type of compound selected from $Al_2O_3$, $Li_2O$ and $B_2O_3$,
a third subcomponent including at least one type of compound selected from $V_2O_3$, $MoO_3$, and $WO_3$,
a fourth subcomponent including an oxide of R1 (where R1 is at least one type of element selected from Sc, Er, Tm, Yb and Lu), and
a fifth subcomponent including $CaZrO_3$ or $CaO+ZrO_2$, wherein
the ratios of the subcomponents with respect to said main component as 100 mol are:
first subcomponent: 0.1 to 3 mol,
second subcomponent: 1 to 10 mol (however, number of moles of second subcomponent is ratio converted to Al, Li or B elements),
third subcomponent; 0.01 to 0.5 mol,
fourth subcomponent: 0.5 to 7 mol (however, number of moles of fourth subcomponent is ratio converted to R1 alone),
fifth subcomponent: 0<fifth subcomponent≦5 mol.

2. The dielectric ceramic composition as set forth in claim 1, further having, as a sixth subcomponent, an oxide of R2 (where, R2 is at least one element selected from Y, Dy, Ho, Tb, Gd, and Eu),
the content of said sixth subcomponent being, with respect to said main component as 100 mol, 9 mol or less (however, number of moles of sixth subcomponent is ratio converted to R2 alone).

3. The dielectric ceramic composition as set forth in claim 1, further having, as a seventh subcomponent, MnO or $Cr_2O_3$,
the content of said seventh subcomponent being, with respect to said main component as 100 ml, 0.5 mol or less (however, ratio converted to Mn or Cr element).

4. A method of production of a dielectric ceramic composition as set forth in claim 1, comprising firing a dielectric material forming said dielectric ceramic composition after firing, then annealing it at 1000 to 1400° C.

5. An electronic device having dielectric layers comprised of the dielectric ceramic composition as set forth in claim 1.

6. A multilayer ceramic capacitor comprised of dielectric layers having a capacitor body comprised of the dielectric ceramic composition as set forth in claim 1 and internal electrode layers alternately stacked.

* * * * *